United States Patent [19]
Raymer

[11] Patent Number: 5,443,353
[45] Date of Patent: Aug. 22, 1995

[54] AUTOMATIC RAMP CAR
[75] Inventor: W. Eddie Raymer, Louisville, Ky.
[73] Assignee: Lincoln Industries, Corp., Louisville, Ky.
[21] Appl. No.: 120,369
[22] Filed: Sep. 14, 1993
[51] Int. Cl.[6] ............................................. B60P 1/43
[52] U.S. Cl. .................................... 414/537; 414/339
[58] Field of Search ................... 414/339, 537, 538; 104/137; 105/448; 296/61

[56] References Cited

U.S. PATENT DOCUMENTS

| | | | |
|---|---|---|---|
| 1,699,882 | 1/1929 | Ferguson | 14/71.1 X |
| 1,704,841 | 3/1929 | Sacerdote | 14/71.1 X |
| 2,190,708 | 2/1940 | Fowler | 14/71.1 X |
| 2,721,758 | 10/1955 | Allen | 296/61 |
| 2,727,781 | 12/1955 | D'Eath | 414/537 X |
| 3,195,478 | 7/1965 | Thompson | 14/71.1 X |
| 3,257,020 | 6/1966 | Fairclough | 414/538 X |
| 3,351,024 | 11/1967 | Broling | 14/71.1 X |
| 3,580,404 | 5/1971 | Moser | 14/71.1 X |
| 3,711,882 | 1/1973 | Iller | 414/537 X |
| 3,730,361 | 5/1973 | Haynes | 105/436 X |
| 3,866,771 | 2/1975 | Reid et al. | 414/537 |
| 3,933,256 | 1/1976 | Fagerlund | 14/71.1 X |
| 4,068,770 | 1/1978 | Boehringer | 14/71.1 X |
| 4,475,761 | 10/1984 | Milroy et al. | 414/537 X |
| 4,527,941 | 7/1985 | Archer | 414/537 |
| 4,616,373 | 10/1986 | Perez | 14/71.1 X |
| 5,312,148 | 5/1994 | Morgan | 414/537 X |

FOREIGN PATENT DOCUMENTS
0220576  3/1959  Australia ................ 414/537

Primary Examiner—Michael S. Huppert
Assistant Examiner—James W. Keenan
Attorney, Agent, or Firm—Nixon & Vanderhye

[57] ABSTRACT

A deployable and retractable ramp assembly is mounted on a flatbed railroad car to allow railroad equipment to be moved to and from tracks. The ramp assembly comprises four ramp sections pivotally connected to each other and in a retracted position in a Z-folded configuration. Each ramp section comprises a pair of rectangular tubes or railroad rails spaced by cross-braces a distance equal to the spacing of wheels of a railroad car on the same axle. Two masts are pivotally connected to the railroad car and can be locked in a substantially upright position, with first and second sheaves on the top end of each mast engaging a cable connected to a winch. A third winch connected by a third cable to the ramp sections applies a restraining force to preclude the ramp sections from moving too quickly under the force of gravity once moved past center during deployment.

22 Claims, 6 Drawing Sheets

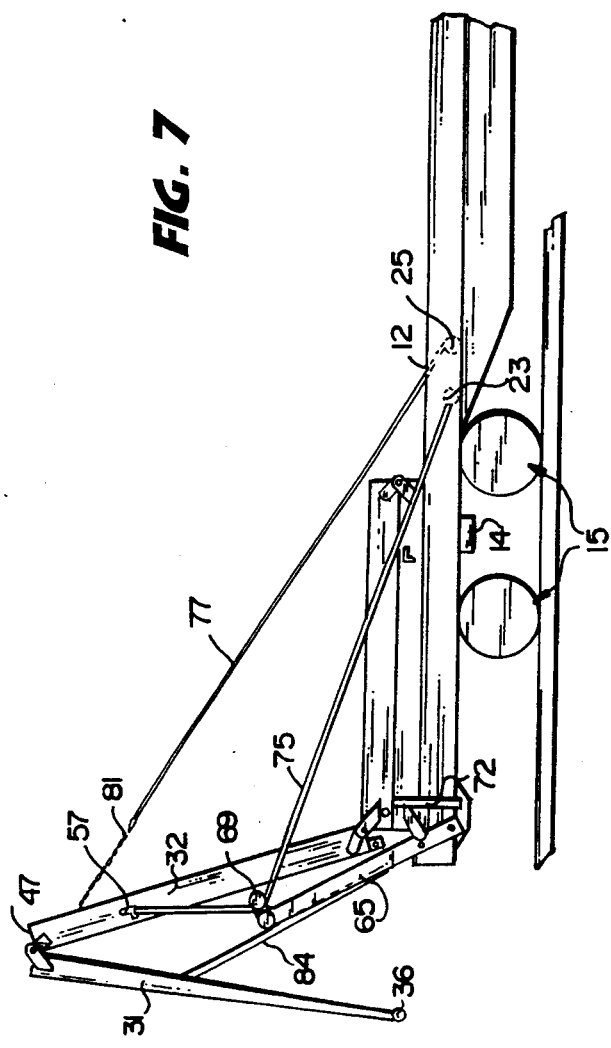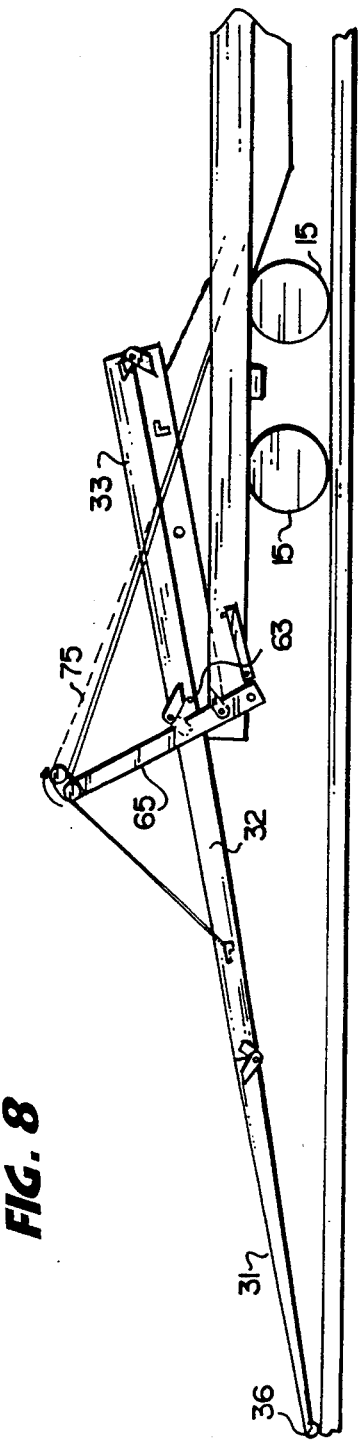

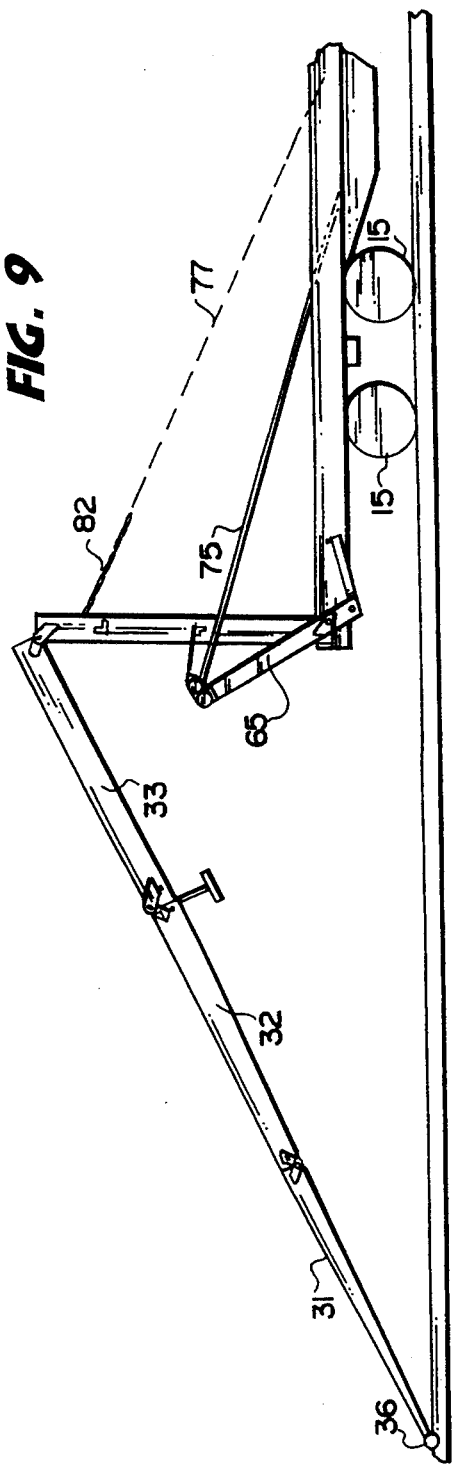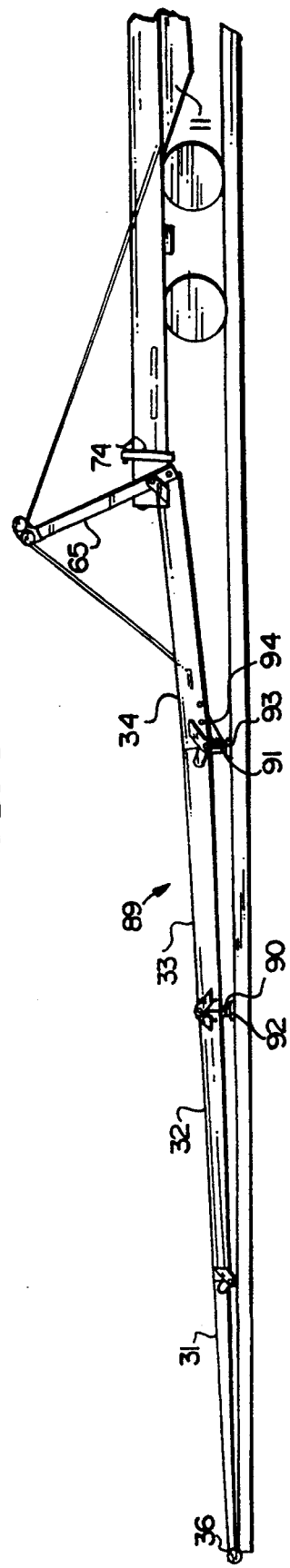

AUTOMATIC RAMP CAR

BACKGROUND AND SUMMARY OF THE INVENTION

There are many situations in which it is desirable to provide a ramp from a vehicle or a loading dock to facilitate elevating heavy objects or vehicles. It is also desirable in some circumstances to provide a ramp that can be deployed and retracted so that it does not interfere with movement of the vehicle, or other uses of the loading dock, when loading using the ramp is not required.

According to the present invention, a deployable and retractable ramp assembly is provided which is reliable, relatively simple to operate, simple to construct, yet is sturdy enough to allow very heavy objects to be moved up and down the ramp when deployed, and when retracted is in a relatively low volume configuration, taking up a minimum amount of surface area. While the ramp assembly has many uses, in association with all types of vehicles, loading docks, and other structures, the invention is particularly applicable to use with a flatbed railroad car. When so utilized, the ramp assembly according to the invention may be used to facilitate loading and unloading of large pieces of railroad equipment (e.g. railroad maintenance or way equipment).

The basic assembly according to the present invention includes a plurality of ramp sections that are pivotally connected to each other; typically two or four sections are provided, with the last section pivotally connected to a support structure (e.g. railroad car), and the ends of the sections pivotally connected to each other in such a way that the ramp sections have a Z-folded configuration when retracted. By having a Z-folded configuration, the sections can deploy in segments, rather than in sequence, in a manner more suitable for ramp sections capable of supporting very heavyweights, and allows sturdy massive ramp sections to be retracted into a more compact position than if the sections were C-folded, or folded in another manner.

To facilitate deployment and retraction of the ramp sections, at least one mast, and preferably first and second masts, are provided, one mounted on each side of the ramp sections. Each mast has first and second sheaves mounted on a top end for cooperation with a cable; the cable moves from cooperation with one of the sheaves to cooperation with the other during deployment and retraction as the ramp sections move from one side of an upright position, overcenter to the other side of the upright position. The masts themselves may be pivotal with respect to a support structure, moved from an inoperative position into a substantially upright, operative position by a hydraulic cylinder connected to an arm engaging each mast, and the masts may be locked in their upright positions to prevent pivotal movement with respect to the support.

Deployment and retraction are necessarily mechanized because of the bulk and weight of the ramp sections. A winch and cable are preferably associated with each mast, and a third winch is provided connectable by a cable to cross braces of the second or fourth ramp sections to provide a restraining force to the ramp sections to prevent them from moving too rapidly under the force of gravity once moved to an overcenter position.

The ramp sections may be locked in place; typically the second and third sections are locked to each other once they are moved in-line. The other sections need not be locked with respect to each other since they unfold into positions in which they abut each other, so that they will not pivot with respect to each other under the force of gravity. Guide wheels may be connected to the free ends of the first section tubes or rails to facilitate movement of the first ramp section along railroad tracks to make deployment easier.

According to one aspect of the present invention, a deployable and retractable ramp assembly is provided comprising the following elements: Two Z-folded ramp sections, comprising first and second sections each having first and second ends, the second end of the first ramp section pivotally connected to the first end of the second ramp section. A first mast having a first end and a second end, the second end having first and second sheaves mounted thereon. A first cable connecting element mounted to at least one of the ramp sections, for connecting a cable end thereto. A first cable dimensioned to operatively engage either of the sheaves, and having a first, free, end adapted to be connected to the first cable connecting element; and first power means connected to a second end of the first cable for selectively deploying or taking up the cable, to power the ramp sections to move from a stacked, Z-folded first position to an unfolded, substantially in-line second position, and vice-versa.

Preferably the ramp assembly comprises four Z-folded ramp sections, a third ramp section pivotally connected at a first end thereof to an end of the second ramp section opposite the first ramp section, and a fourth ramp section pivotally connected at a first end thereof to a second end of the third ramp section. The assembly also preferably further comprises a second mast having first and second ends with first and second sheaves mounted to the second end thereof; a second cable connecting element connected to at least one of the ramp sections; a second cable dimensioned to operatively engage either of the sheaves of the second mast, and having a first, free, end adapted to be connected to the second cable connecting element; and second power means connected to a second end of the second cable for selectively deploying or taking up the cable, to, with the first power means, power the ramp sections to move from a stacked, Z-folded first position to an unfolded, substantially in-line second position, and vice-versa; the first and second masts mounted on opposite sides of the ramp sections. The ramp sections each may comprise first and second 6×12 inch rectangular tubes, or railroad rails spaced from each other by cross braces the same distance as the spacing of railroad car wheels on a common axle, and the fourth ramp section may be pivotally mounted to a flatbed railroad car.

According to another aspect of the present invention, there is provided a railroad car for mechanized loading and unloading of maintenance of way equipment therefrom. The railroad car comprises: A substantially flat load-carrying surface of the railroad car, and a plurality of railroad car wheels, on axles, supporting the load-carrying surface. And a deployable and retractable ramp assembly mounted to the railroad car and when in a deployed position providing a ramp for the movement of maintenance of way equipment from railroad tracks to the railroad car, or vice versa. The assembly comprises: two Z-folded ramp sections, comprising first and second sections each having first and second ends, the second end of the first ramp section pivotally connected to the first end of the second ramp section; the ramp sections each comprising first and second rectangular tubes or railroad rails spaced from each other by cross braces the same distance as the spacing of railroad car wheels on a common axle; and means mounted on the railroad car for effecting powered pivotal movement of the first and second ramp sections with respect to each other to be deployed in a position in which the first and second ramp sections are substantially in-line and maintenance of way equipment on a railroad track may move up the tubes or rails of the ramp sections to the railroad car, and a retracted position in which the ramp sections are Z-folded and rest on the railroad car load-carrying surface.

The railroad car further preferably comprises a fossil fuel powered engine mounted on or adjacent the load-carrying surface; and the means for effecting powered pivotal movement of the ramp sections preferably comprises electric or fluid or both motors, the motors ultimately powered by the fossil fuel powered engine. Preferably three hydraulic winch motors and two hydraulic cylinders are provided.

According to a still further aspect of the present invention, an assembly for mechanized deployment or retraction of a ramp is provided which comprises: A support for the ramp. A plurality of ramp sections pivotally connected to each other at the ends thereof, and one of the ramp sections pivotally connected to the support. First and second masts each having a first end pivotally connected to the support for pivotal movement about a pivot axis, and a second, free end with at least one sheave mounted thereon. Means for moving the masts about the pivot axes from a first, inoperative, position generally along the support to a second, operative, position upstanding from the support. Means for selectively locking the masts in the second positions to preclude pivotal movement of the masts about the pivot axes when in the second positions; and first and second cables passing in operative association with the first and second mast sheaves, respectively, and having free ends thereof connectable to one or more of the ramp sections. The masts each have first and second sheaves mounted on the second ends thereof, the first and second cables dimensioned to cooperate with the sheaves.

According to a still further aspect of the present invention, a method is provided of deploying and retracting a ramp. The ramp has first and second Z-folded ramp sections, the first section having a free first end and a second end pivotally connected to the first end of the second ramp section, and the second end of the second ramp section pivotally connected to another structure, utilizing an upstanding mast having a free end with first and second sheaves mounted thereon, and a cable having a free end and dimensioned to cooperate with the sheaves. The method comprises the steps of: (a) Passing the cable around the first sheave, and connecting the free end thereof to the second ramp section. (b) Applying a first force, in a first direction, to the cable to move the free end of the cable toward the first sheave, causing the ramp sections to lift up to substantially an upright position as the second ramp section pivots about its pivotal connection to another structure. (c) Continuing to apply the first force to the cable causing the free end of the cable to move toward the first sheave until the ramp sections move past the upright position, and the first ramp section, under the force of gravity, starts to pivot away from the second ramp section, while applying a restraining force to the second ramp section to prevent the ramp sections from falling too rapidly past the upright position after passing past the upright position. (d) Once the ramp sections have moved to a position in which further application of the first force does not further deploy the ramp sections, terminating application of the first force to allow the cable to move into operative association with the second sheave, and so that the ramp sections continue to move under the force of gravity so that the first and second sections pivot with respect to each other until the first and second sections are substantially in-line, abutted against each other; and then (e) disconnecting the cable from the second ramp section.

The ramp also preferably includes third and fourth ramp sections, the third ramp section first end being the other structure to which the second ramp section is pivotally connected, and a second end of the third ramp section pivotally connected to a first end of the fourth ramp section, so that the ramp sections are all Z-folded with respect to each other, with the fourth ramp section pivotally connected at a second end thereof to yet another structure; and wherein the second and third sections are substantially in-line with each other when step (e) is practiced. The method then also comprises the further steps of: (f) After step (e), connecting the cable free end to the fourth ramp section, the cable in engagement with the first sheave, and locking the second and third ramp sections together in substantially in-line position. (g) Applying the first force to the cable again to elevate the fourth ramp section while the third and fourth ramp sections pivot with respect to each other and the first, second and third sections move away from the fourth section, until the fourth section reaches substantially an upright position. (h) Continuing to apply the first force to the cable causing the free end of the cable to move toward the first sheave until the fourth ramp section moves past the upright position, while applying a restraining force to the fourth ramp section to prevent the fourth ramp section from falling too rapidly past the upright position after passing past the upright position. (i) Once the fourth ramp section has moved to a position in which further application of the first force does not further deploy the ramp sections, terminating application of the first force to allow the cable to move into operative association with the second sheave, and so that the ramp sections continue to move under the force of gravity so that the third and fourth sections pivot with respect to each other while the fourth section pivots with respect to the yet another structure until the third and fourth sections are in line with, and abut, each other; and (j) disconnecting the cable from the fourth ramp section.

The method also preferably comprises the further step (k) of reinforcing the ramp sections adjacent the pivotal connections between the second and third, and third and fourth sections by supporting them off the top of a railroad rail. The method also preferably comprises the further steps of retracting the ramp sections by practicing steps (j)–(a) in reverse but applying a second force in a second direction, opposite the first direction, in place of where gravity is the moving force in steps (a)–(j), and wherein gravity, counteracted by a restraining force to prevent too rapid a movement, takes the place of the first force in steps (a)–(j).

It is the primary object of the present invention to provide for the effective loading and unloading of objects or vehicles, regardless of weight, using a deployable and retractable simple but sturdy ramp assembly.

This and other objects of the invention will become clear from an inspection of the detailed description of the invention, and from the appended claims.

BRIEF DESCRIPTION OF THE DRAWINGS

FIGS. 6–11 are views like that of FIG. 5 showing the ramp assembly according to the present invention as it moves, in sequence, from a position near the start of deployment all the way to a fully deployed position.

DETAILED DESCRIPTION OF THE DRAWINGS

Figure 1:
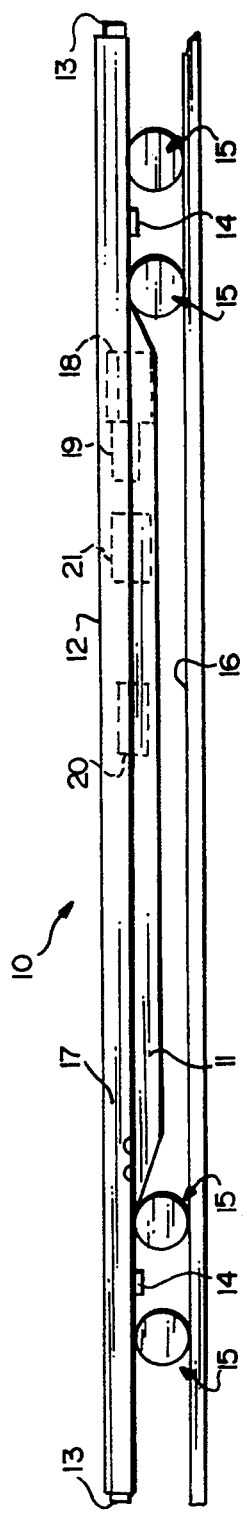
FIG. 1 is a schematic side view of a railroad car according to the present invention, showing various power-related components thereof, but with a deployable ramp assembly according to the present invention removed therefrom.

A railroad car (flatbed type) according to the present invention, for mounting a deployable ramp assembly according to the invention, is shown schematically by reference numeral 10 in FIG. 1. The car has a center sill 11 supporting a substantially flat load-supporting surface (car deck) 12. Car strikers 13 are provided at either end of the deck 12. The sill 11 and deck 12 are supported by wheel trains 15 (four of them in the exemplary embodiment illustrated in FIG. 1), each comprising a pair of conventional railroad car wheels supported by a common axle (not shown), and adapted to move smoothly along the rails 16 of a railroad track. Center plates 14 are provided between the wheel trains 15 on opposite ends of the deck 12, and a side sill 17 extends downwardly from all edges of the deck 12.

Mounted on or adjacent (e.g. underneath with components passing through, recessed in, on the side of, etc.) the deck 12 is an internal combustion engine 18 or other ultimate source of energy for powering the deployable ramp assembly to be hereinafter described. The engine 18 burns fossil fuel (e.g. gasoline, diesel fuel, natural gas, propane, etc.) to power electric and/or fluidic (e.g. hydraulic) motors associated with the various components of the ramp assembly. For example, a conventional hydraulic pump 19 is connected to the engine 18, the engine supplied with fuel from the tank 20, and a hydraulic oil tank or reservoir 21 being associated with the pump 19. In FIG. 1 these structures are shown mounted beneath the deck 12 on the opposite side of the center sill 11 from that seen in FIG. 1, but as indicated above this is only one of many alternative locations.

Figure 3:
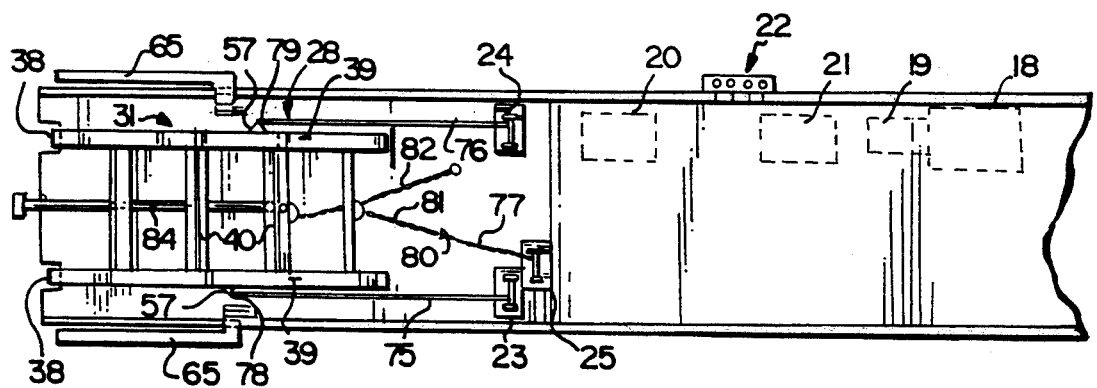
FIG. 3 is a top plan view of the end of the railroad car of FIG. 1 on which is mounted a retracted ramp assembly according to the present invention.

The components mounted on the car 10 further preferably comprise the control panel 22 and the first, second, and third conventional hydraulically powered winches 23, 24, 25, respectively, seen in FIGS. 1 and 3. Also, preferably two hydraulic cylinders—only one of which is shown schematically at 26 in FIGS. 4 and 5—are provided mounted on the inside of the side sill 17 on opposite sides of the deck 12 adjacent the "A" end of the car 10 illustrated in FIGS. 3–11.

The ramp assembly according to the present invention is illustrated generally by reference numeral 28 in FIGS. 3–11. In the preferred embodiment, the assembly 28 comprises four ramp sections, although it may only comprise two sections, or even six sections (or another number) depending upon the particular use to which it will be put, and the particular environment it is to be used in. In the embodiment illustrated in the drawings in which the assembly is to be deployed from the A end of the car 10, it preferably includes the first through fourth ramp sections 31–34, the first section 31 being the one that will be deployed furthest from the support (car 10), with the second section 32 next to it, then the third section 33, and finally the fourth section 34.

Figure 4:
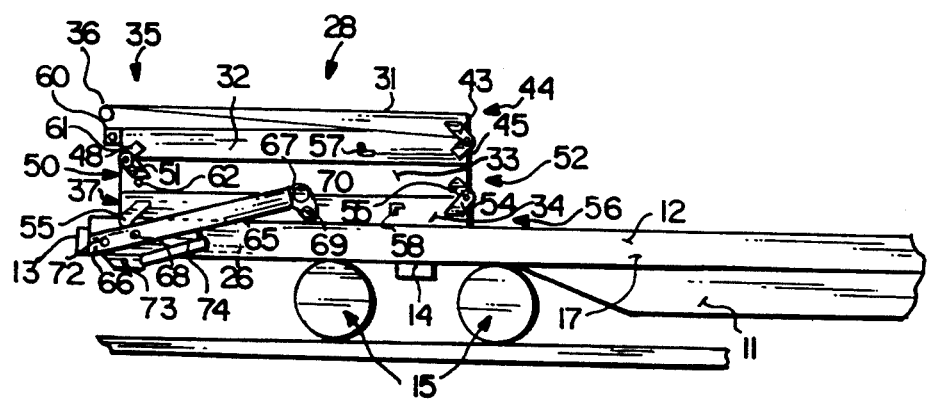
FIG. 4 is a side view of the same structure shown in top plan view in FIG. 3.

In the retracted configuration illustrated in FIGS. 3 and 4, the sections 31–34 are in a Z-fold configuration. In that configuration, the first to deploy section is on the top, the second (32) next, and the last (34) on the bottom (resting on the deck 12). They are also mounted so that they all deploy outwardly from the car 10 during substantially the entire course of movement thereof. The sections 31–34 are all pivoted to each other at the ends thereof for pivotal movement with respect to each other about horizontal axes. The first end 35 of the first section 31 is "free", and preferably has removable wheels 36 mounted thereto, while the second end 37 of the fourth section 34 (which substantially underlies the wheels 36 in the retracted stack see in FIGS. 3 and 4) is pivotally mounted to the car 10 adjacent one end thereof, e.g. within the cutouts 38 (see FIG. 3).

Figure 2:
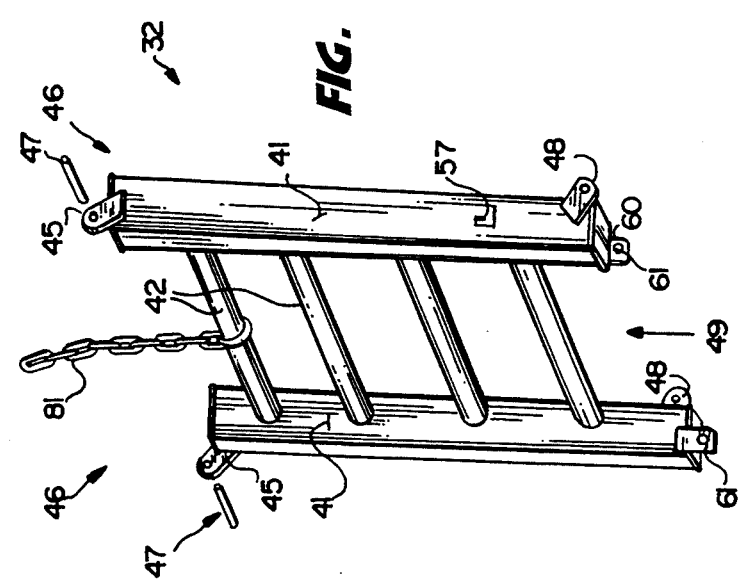
FIG. 2 is a perspective schematic view of a second exemplary ramp section of the ramp assembly according to the present invention.

In the embodiment illustrated in the drawings, the sections 31–34 are each constructed from a pair of 6×12 inch rectangular tubes (or railroad rails could be used, although heavier) spaced apart by cross braces. For example, for the first ramp section 31, as seen in FIG. 3, the tubes 39 are spaced by the cross braces 40, the spacing between them corresponding to the spacing between the wheels of a conventional railroad car on the same axle, so that a railroad track-riding wheeled vehicle can move up and down the tubes 39. FIG. 2 shows the second ramp section 32 formed by tubes or rails 41 spaced apart by cross braces 42; and similarly for the other sections 33, 34. Alternatively, under some circumstances a flat ramp plate may be provided instead or or in addition to the tubes or tubes or rails 39 for the ramp sections 31–34.

The sections 31–34 are pivotally connected to each other by any suitable means, but preferably by hinge flanges that extend upwardly or downwardly and outwardly from the tubes or rails forming the sections. For example, hinge flanges 43 and the second end 44 (see FIG. 4) of the first section 31 are connected to hinge flanges 45 at the first end 46 of second section 32 (see FIGS. 2 and 4), as by hinge pins 47. Hinge flanges 48 are provided at the second end 49 of the second ramp section 32 which extend substantially 180 degrees in orientation from the hinge flanges 45. That is, as seen in FIG. 4, the hinge flanges 45 extend upwardly and to the right from the first end 46, while the hinge flanges 48 extend downwardly and to the left. The third section 33 first end 50 has hinge flanges 51 connected by pins to the flanges 48, and its second end 52 has hinge flanges 53 connected by pins to hinge flanges 54 at the first end 56 of fourth section 34. The second end 37 of fourth section 34 has hinge flanges 55 connected by pins to the car 10, in recesses 38 (FIG. 3).

At least some of the sections 31-34 have cable connection elements associated therewith. Preferably, both the second and fourth sections 32, 34 have cable connection elements, such as the metal eyes or handles 57, 58 respectively. Note that an element 57 is mounted on each of the tubes or rails 41, opposite each other, while an element 58 is mounted on either side of the fourth section 34 (see FIGS. 2 and 4 in particular).

While most of the end portions of the sections 31-34 do not need locking components since the tubes or rails forming them abut together when in a deployed, substantially in-line position (e.g. the ends 46 of the tubes or rails 41 abut the ends 44 of the tubes or rails forming the first section 31 when in-line to prevent further movement about the horizontal pivot axis defined by pins 47), since when deployed the ends of the second and third sections 32, 33 will not abut (because of the location of the hinge flanges associated therewith, which location is necessary for proper Z-folding of the ramp assembly), a locking mechanism is necessary between them. Such a locking mechanism may take the form of the flanges 60 which are connected to the inside surfaces of tubes or rails 41 (see FIG. 2) and extend directly outwardly from end 49, aligned with the tubes or rails 46, having openings 61 therein, and cooperating openings 62 (see FIGS. 4 and 5) formed adjacent the end 50 of the third section 33. When the sections 32, 33 are substantially in-line (when deployed—see FIGS. 8-11), a locking pin 63 (see FIG. 8) is placed through each set of aligned openings (61, 62) to preclude further pivotal movement of the sections 32, 33 with respect to each other.

The ramp assembly also comprises at least one mast 65 (see FIGS. 3-11), and preferably two masts 65 (see FIG. 3) one on each side of the deck 12 at the A end thereof, which cooperate with cables and the winches 23-25 to effect deployment and retraction of the ramp sections 31-34. While the masts 65 may be permanently mounted to the side sills 17 so that they are in a substantially upright operative position (as in FIGS. 5-10), preferably they are mounted for pivotal movement with respect to car 10 so that they may be in an out-of-the way position (FIGS. 3, 4, and 10) when inoperative. Only one mast 65 will be hereinafter described, it being understood that where two masts 65 are used or necessary (e.g. for deploying the embodiment illustrated in the drawings, due to the heavy construction of the ramp sections 31-34) they are substantially identical.

Mast 65 has a first, lower, end 66, and a second, upper, end 67. The mast 65 is pivotally connected to the side sill 17 adjacent the first end 66 thereof, as with pivot pin 68. At the second end 67 thereof, first and second sheaves 69, 70 are preferably mounted, both rotatable about parallel horizontal axes, and spaced slightly from each other. When the mast 65 is pivoted to its operative, substantially upright, position (FIGS. 5-10), it is locked in that position by locking means. Such locking means may take a wide variety of forms, but in a very simple embodiment comprises a locking pin 71 (FIG. 5) extending through aligned openings 72, 73 adjacent the end 66 of mast 65, and in the sill 17 (or a downward extension thereof), as seen in FIG. 4.

Figure 5:
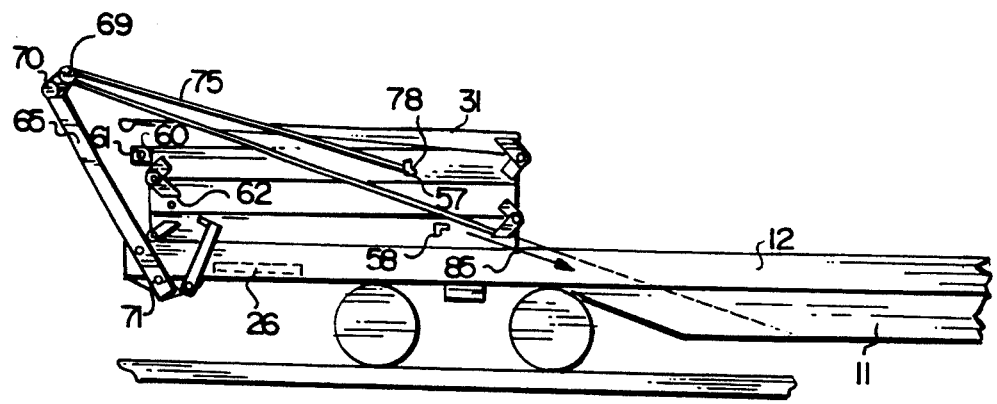
FIG. 5 is a view like that of FIG. 4 with the components connected up to start deployment of the ramp assembly from the railroad car.

The mast 65 may be moved between its operative and inoperative positions (especially lifted to its operative position) by the hydraulic cylinder 26 acting through an arm 74. The arm 74 in the preferred embodiment illustrated in FIGS. 4 and 5 is not rigidly connected to mast 65, but rather only abuts it at the free end thereof. For example by extending the piston from the hydraulic cylinder 26, the arm 74 is moved into contact with the mast 65, and pivots it upwardly toward its operative position.

Cables are associated with each of the winches 23-25. A first cable 75 is associated with first winch 23, and second and third cables 76, 77 with winches 24, 25, respectively. The cables 75-77 have free ends 78-80, respectively, thereof which are adapted to be connected to various other elements associated with the ramp sections 31-35. When the ramp assembly 28 is being transported in its retracted configuration (see FIGS. 3 and 4), the cable 75, 76 free ends 78, 79 may be connected to the connection elements 57, and the winches 23, 24 operated so that the cables 75, 76 are tight, to help hold the sections 31-34 in the stack illustrated in FIGS. 3 and 4. The free end 80 of cable 77 is connected to one of the retard chains 81, 82 connected to a cross brace of the sections 32, 34, respectively (see retard chain 81 connected to cross brace 42 in FIG. 2, for example; both retard chains 81, 82 are illustrated in FIG. 3). In FIG. 3, the winch 25 has pulled the cable 77—which is connected to chain 81—taut so that it too helps hold the ramp assembly 28 in the Z-folded stack configuration of FIGS. 3 and 4.

Another desirable component of the assembly 28 is a "kicker rod" 84 (FIGS. 3 and 6; two or more rods 84 may be provided instead of the one rod illustrated) pivotally connected at one end thereof to a cross brace 40 of the first section 31 (FIG. 3). This rod 84 functions to assist in moving the section 31 out away from the section 32 during deployment, especially when the position illustrated in FIG. 7 is reached.

All of the basic components of the assembly 28 have now been described, so the preferred manner of operation thereof to deploy the ramp sections 31-34 will now be set forth:

After the masts 65 are raised to their operative positions (FIGS. 5-10) the ends 78, 79 of the cables 75, 76 are passed around the first sheaves 69 and then connected to the elements 57 (see FIG. 4) by any desired conventional means, such as a clasp, clamp, hook, or by tying. Then the cables 75, 76 are pulled taut by the winches 23, 24, and once taut continued operation of the winches 23, 24 applies a first force 85 (FIG. 5) in a first direction, the force 85 causing the connection element 57 to move closer to the sheave 69. This causes the second section 32, and the first section 31 which is resting thereon, to be elevated toward a substantially upright position, illustrated in FIG. 6.

Figure 6:
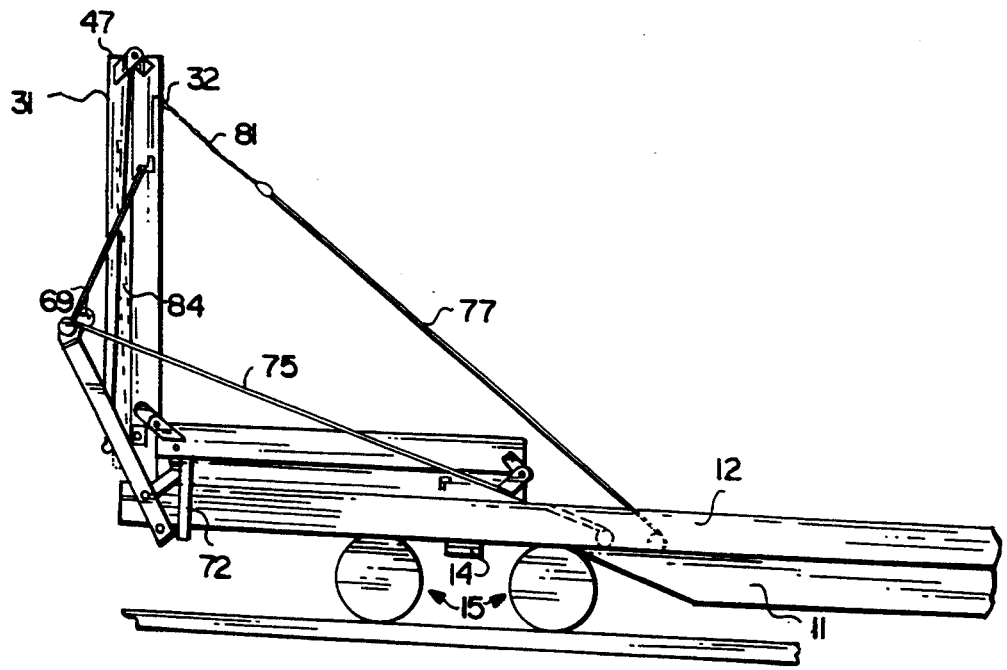
Figure 11:
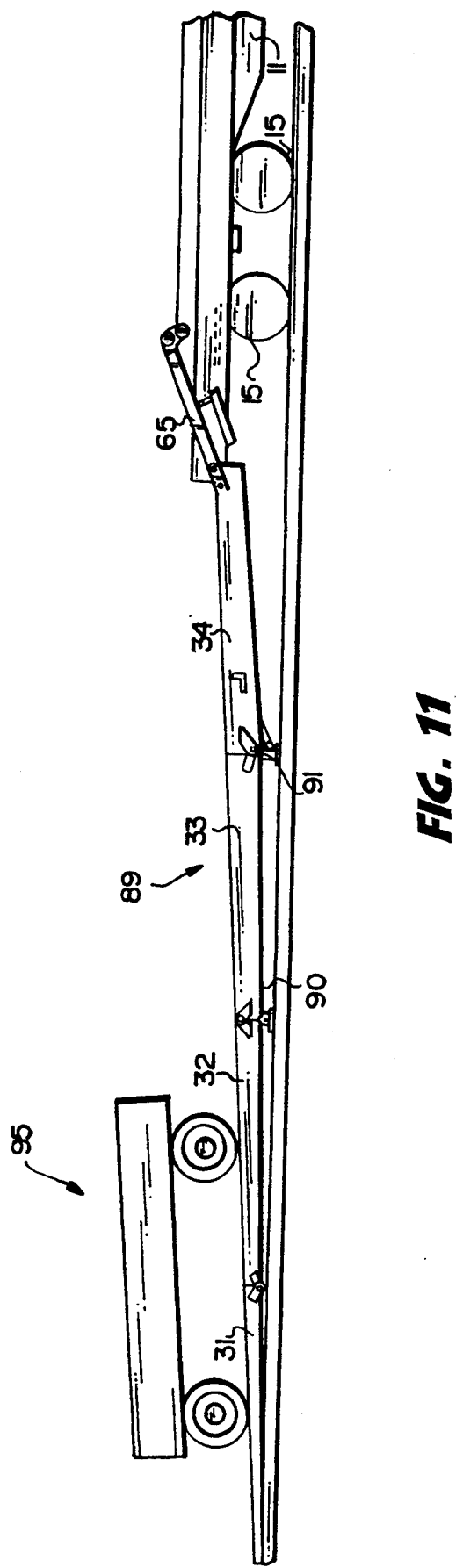

In order to prevent the sections 31, 32 from falling too rapidly once they past overcenter past the upright position of FIG. 6, the retarding cable 81 is connected up to the third cable 77 associated with third winch 25, as seen in FIG. 6. The cable 77 is let out slowly by the winch 25 once the sections 31, 32 pass overcenter, as seen in FIG. 7, the weight of the sections 31, 32 causing them to deploy, and the sections 31, 32 pivoting with respect to each other about pivot pins 47 so that the wheels 36 at the first end 35 of the first section 31 move away from the car 10. Once the position illustrated in FIG. 7 is reached, the free end of the kicker rod 84 engages the deck 12, and thus applying a force to brace 40 tending to move the section 31 away from the car 10 in a more pronounced manner.

Once the sections 31, 32 reach approximately the position of FIG. 7 (where the connection element 57 is closest to the sheave 69), overcenter with respect to upright (FIG. 6), the winches 23, 24 are reversed so that the cables 75, 76 are let out, providing for controlled descent of the sections 31, 32 under the force of gravity. At this point, where the winches 23, 24 are reversed, the cable 77 is detached from the retard chain 81, since the retarding action thereof is no longer necessary. When this happens, the cables 75, 76 move into operative contact and association with the second sheaves 70 (see FIG. 8). This action continues until approximately the position of FIG. 8 is reached, all the while the wheels 36 engaging and rolling along the track rails 16.

At the position of FIG. 8, the sections 31-33 are substantially in-line with each other. In this position, adjacent ends of the tubes or rails 39, 41 of the sections 31, 32, respectively, will abut each other, with the force of gravity precluding further pivotal movement of the sections 31, 32 with respect to each other. While the ends of the sections 32, 33 adjacent each other will also abut, because the hinge flanges 48, 51 associated therewith are on top of the sections 32, 33, when a heavy object is moved up the ramp formed by the sections 31-34, the sections 32, 33 will undesirably pivot away from each other. To prevent this, once the sections 32, 33 have moved to the position of FIG. 8, the locking pins 63 are passed through the openings 61, 62, locking the sections 32, 33 in the in-line position illustrated in FIG. 8.

To continue deployment, the ends 78, 79 of cables 75, 76 are disconnected from the elements 57, the cables 75, 76 are passed over the sheaves 69, and the ends 78, 79 of the then slack cables 75, 76 are then attached to the connection elements 58, as seen in the dotted line position of cable 75 in FIG. 8. The winches 23, 24 are then rotated to take up the cables 75, 76—again applying the first force 85—to lift the fourth section 34 toward the upright position illustrated in FIG. 9. At this time (or before it), the cable 77 is connected up to the retard chain 82, to prevent the sections 31-34 from dropping too rapidly once the overcenter position of FIG. 9 is reached.

Once approximately the position of FIG. 9 is reached, the cables 75, 76 are let off the winches 23, 24 (i.e. the direction of rotation of the winches 23, 24 are reversed), and the sections 34 slowly lowered, under the force of gravity, to the position illustrated in FIG. 10, where the fourth section 34 is now in-line with the sections 31-33, and the ends of the sections 33, 34 abut each other.

In order to support heavy loads or vehicles moving up the ramp 89 (FIGS. 10 and 11) deployed from the sections 31-34, the legs 90, 91 are preferably deployed. The vertical support leg 90, having a bottom foot 92 engaging the top of a track, is connected by a retaining pin (not shown) to one of the sections 32, 33 adjacent the pivotal joint between them. The leg 91, with its foot 93 engaging the top of a track, is connected by a pin (not shown) to one of the sections 33, 34 adjacent the pivotal joint between them. A brace 94 may also be connected by pins (not shown) to the section 34 and the leg 91 to help keep it in its supporting position, illustrated in FIGS. 10 and 11.

Once the ramp 89 is in the FIG. 10 position, it is fully deployed, and to effect use thereof it is desirable to disconnect the wheels 36 from the first end 35 of the first section 31 (the wheels 36 being connected by any suitable conventional release connection, such as a clamp, axle slidable into a bearing opening, etc.), and to move the masts 65 to their inoperative configurations by removing the pins 71 and pivoting the masts 65 toward the car 10 until they engage the arms 72, which arms are then lowered by the cylinders 26. A heavy object—such as the piece of railroad maintenance equipment 95 seen in FIG. 11—may then roll up the tubes or rails 39, 41, etc. formed by the sections 31-34 and be positioned on the deck 12 for transport to another, remote, location. Since the ramp 89 is relatively long, having the combined length first through fourth substantially equal length sections 31-34, movement of the ramp 89 is relatively simple.

In order to retract the ramp 89, the procedure described above is reversed, the cables 75-77 being connected as necessary, and the winches 23-25 operated as necessary, to lift the sections 31-34, and prevent them falling too quickly into the Z-folded configuration illustrated in FIGS. 3 and 4.

It will thus be seen that according to the present invention, a simple, effective, sturdy, yet easy to contract ramp assembly has been provided which may be deployed or retracted, as well as a railroad car which supports the ramp assembly, and a method for effectively deploying and retracting the ramp assembly. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures, devices, and methods.

What is claimed is:

1. A deployable and retractable ramp assembly comprising:
    at least three Z-folded ramp sections, comprising first, second and third sections each having first and second ends, said second end of said first ramp section pivotally connected to said first end of said second ramp section, and said third section first end pivotally connected to said second section second end;
    a first mast having a first end and a second end, said second end having first and second sheaves mounted thereon;
    a first cable connecting element mounted to at least one of said ramp sections, for connecting a cable end thereto;
    a first cable dimensioned to operatively engage either of said sheaves, and having a first, free, end adapted to be connected to said first cable connecting element; and
    first power means connected to a second end of said first cable for selectively deploying or taking up said cable, to power said ramp sections to move from a stacked, Z-folded first position to an unfolded, substantially in-line second position, and vice-versa.

2. An assembly as recited in claim 1 wherein said at least three ramp sections comprises four Z-folded ramp sections, including a fourth ramp section pivotally connected at a first end thereof to a second end of said third ramp section.

3. An assembly as recited in claim 2 wherein each of said ramp sections comprises parallel first and second rectangular tubes or railroad rails spaced from each other; and further comprising cross braces for spacing said tubes or rails, wherein said masts are adapted to be mounted on a railroad car to which a second end of said fourth ramp section is adapted to be pivotally connected.

4. An assembly as recited in 3 further comprising means for mounting said masts for pivotal movement with respect to said railroad car from a deployed position in which they extend substantially upright and cooperate with both said cable and power means to deploy or retract said ramp sections, and a retracted position in which they are in an inoperative position, disposed generally on or along said railroad car.

5. An assembly as recited in claim 4 further comprising a fluid cylinder and a mast engaging arm mounted to said railroad car associated with each of said masts for moving said masts between said deployed and retracted positions thereof; and means for locking said masts in said deployed positions so that said masts cannot pivot with respect to said railroad car.

6. An assembly as recited in claim 3 wherein said first cable connection element comprises distinct first and second elements connected to opposite sides of said second ramp element, and wherein said second cable connection element comprises distinct first and second elements connected to opposite sides of said fourth ramp element.

7. An assembly as recited in claim 6 wherein said first and second power means comprises first and second reversible winches mounted to said railroad car.

8. An assembly as recited in claim 7 further comprising a third reversible winch mounted to said railroad car, and a third cable having a first, free end thereof and a second end connected to said third winch; and further comprising means for selectively connecting said first, free, end of said third cable to a cross-brace of said second and said fourth ramp sections.

9. An assembly as recited in claim 3 further comprising first and second guide wheels releasably connected to said first tubes or rails at said first end of said first ramp section.

10. An assembly as recited in claim 2 further comprising means for locking said second and third sections in a substantially in-line position when they are deployed.

11. An assembly as recited in claim 2 further comprising supporting legs which automatically deploy from said ramp sections for supporting said ramp sections, including supporting legs adjacent said pivotal connections between said second and third ramp sections, and between said third and fourth ramp sections, when said ramp sections are deployed.

12. An assembly as recited in claim 2 further comprising a second mast having first and second ends with first and second sheaves mounted to said second end thereof; a second cable connecting clement connected to at least one of said ramp sections; a second cable dimensioned to operatively engage either of said sheaves of said second mast, and having a first, free, end adapted to be connected to said second cable connecting clement; and second power means connected to a second end of said second cable for selectively deploying or taking up said second cable, to cooperate with said first power means to power said ramp sections to move from a stacked, Z-folded first position to an unfolded, substantially in-line second position, and vice-versa; said first and second masts mounted on opposite sides of said ramp sections.

13. An assembly as recited in claim 1 further comprising supporting legs which automatically deploy from said ramp sections for supporting said ramp sections, including supporting legs adjacent said pivotal connections between said second and third ramp sections 14. An assembly as recited in claim 1 wherein each of said ramp sections comprises first and second rectangular tubes spaced from each other by cross-braces.

15. An assembly as recited in claim 14 further comprising a second cable having a first, free end thereof and a second end connected to a winch, and means for selectively connecting said first, free end of said second cable to a cross-brace of said second ramp section 16. An assembly as recited in claim 14 further comprising first and second guide wheels releasably connected to said first tubes at said first end of said first ramp section 17. A deployable and retractable ramp assembly comprising:
at least two ramp sections, comprising first and second sections each having first and second ends, said second end of said first ramp section pivotally connected to said first end of said second ramp section;
a support structure having a first end, said second ramp section second end pivotally connected to said support structure first end, so that said ramp sections may be folded in a stack on said support structure;
a first mast having a first end and a second end, said second end having first and second sheaves mounted thereon;
a first cable connecting element mounted to at least one of said ramp sections, for connecting a cable end thereto;
a first cable dimensioned to operatively engage either of said sheaves, and having a first, free, end adapted to be connected to said first cable connecting element; and
first power means connected to a second end of said first cable for selectively deploying or taking up said cable, to power said ramp sections to move said ramp sections from a stacked, folded first position to an unfolded, substantially in-line second position, and vice-versa.

18. An assembly as recited in claim 17 wherein said support structure comprises a third ramp section, and wherein each of said ramp sections comprises first and second rectangular tubes or railroad rails spaced from each other, and further comprising cross braces for spacing said tubes or rails, and wherein said ramp sections are Z-folded in said first, stacked position.

19. An assembly as recited in claim 18 wherein at least said second ramp section comprises first and second side elements spaced from each other by cross-braces; and further comprising a winch, and a second cable having a first, free end thereof and a second end connected to said winch, and means for selectively connecting said first, free end of said second cable to a cross-brace of said second ramp section.

20. An assembly as recited in claim 19 wherein each of said ramp sections comprises first and second rectangular tubes spaced from each other by cross-braces.

21. An assembly as recited in claim 20 further comprising a second cable having a first, free end thereof and a second end connected to a winch, and means for selectively connecting said first, free end of said second cable to a cross-brace of said second ramp section 22. A deployable and retractable ramp assembly comprising:
at least three Z-folded ramp sections, comprising first, second and third sections each having first and second ends, said second end of said first ramp section pivotally connected to said first end of said second ramp section, and said third section first end pivotally connected to said second section second end;
a first mast having a first end and a second end, said second end having at least a first sheave mounted thereon;
a first cable connecting element mounted to operatively engage at least said first sheave;
a first cable dimensioned to operatively engage said first sheave, and having a first, free, end adapted to be connected to said first cable connecting element;
first power means connected to a second end of said first cable for selectively deploying or taking up said cable, to power said ramp sections to move from a stacked, Z-folded first position to an unfolded, substantially in-line second position, and vice-versa;
a substantially planar supporting structure; and
means for mounting said mast for pivotal movement with respect to said supporting structure so that said mast is pivotal from a deployed position in which it extends substantially upright and cooperates with said cable and power means, to deploy or retract said ramp sections, and a retracted position in which said mast is in an inoperative position disposed generally on or along said support structure.

* * * * *